United States Patent [19]
Zannini

[11] Patent Number: 4,993,501
[45] Date of Patent: Feb. 19, 1991

[54] HYDRAULIC HAMMER IN PARTICULAR FOR USE IN DUSTY AND/OR CORROSIVE ENVIRONMENTS

[75] Inventor: Gianfranco Zannini, Limena, Italy
[73] Assignee: TECHMO Car S.p.A, Limena Po, Italy
[21] Appl. No.: 345,090
[22] Filed: Apr. 28, 1989
[30] Foreign Application Priority Data
Jun. 14, 1988 [IT] Italy .............. 20959 A/88
[51] Int. Cl.$^5$ .............................................. B23B 45/16
[52] U.S. Cl. .................................... 173/76; 173/57; 173/73; 91/325
[58] Field of Search .............. 173/58, 71, 75–77, 173/73, 78, 80, 134; 91/325, 404, 433

[56] References Cited

U.S. PATENT DOCUMENTS

| | | |
|---|---|---|
| 2,423,787 | 7/1947 | Mosena . |
| 2,906,244 | 9/1958 | Christensen . |
| 3,154,154 | 10/1964 | Wicklund .......................... 173/76 |
| 3,973,633 | 8/1976 | Brannstrom ....................... 173/75 |
| 4,174,010 | 11/1979 | Hibbard . |
| 4,553,610 | 11/1985 | Pelto-Huikko et al. .......... 173/76 X |

Primary Examiner—Paul A. Bell
Assistant Examiner—Willmor Fridie, Jr.
Attorney, Agent, or Firm—Collard, Roe & Galgano

[57] ABSTRACT

A hydraulic hammer is provided, suitable for use as a crust-breaker of aluminum electrolysis pots, having a hydraulically actuated beating mass reciprocally movable in a cylindr to strike against a tool, an intake duct with a filter and a one way valve for conveying external air into a top chamber defined by the rear face of the beating mass, the inner surface of the cylinder and the upper base of the cylinder during the downward stroke of the beating mass, a connection duct with a one way valve for conveying the filtered air contained in the top chamber into a bottom chamber defined by the front face of the beating mass, the inner surface of the cylinder and the rear face of the tool during the upwards movement of the beating mass, so that an over pressure is created in the bottom chamber to exclude dust, etc., from entering through the clearance between the tool and the guide bushing.

2 Claims, 2 Drawing Sheets

HYDRAULIC HAMMER IN PARTICULAR FOR USE IN DUSTY AND/OR CORROSIVE ENVIRONMENTS

DESCRIPTION

The present invention relates to a hammer for producing holes, actuated by means of a hydraulic system, i.e., a hydraulic hammer, particularly suitable for use in dusty, corrosive environments, and similarly hostile environments.

In such a hammers, as known, a "beating mass" sliding inside a cylinder and provided with a reciprocating motion, beats on a "sinker drill", or "working tool" and supplies it with the percussion motion it needs in order to produce the hole.

Such hammers are used in the works inside mines and quarries, in roadworks, in industry, and so forth. The hydraulic-driven hammers are widely used, and are often preferred to the pneumatic-driven hammers thanks to their characteristics of higher compactness and of smaller overall dimensions than these latter. Unfortunately, they have the drawback, when used in particularly dusty and/or corrosive environments, of requiring the use of complex protecting systems or devices, in order to be protected against the wear of the mechanical moving parts. These protecting systems or devices considerably limit the advantages derived from the use of this type of hammer. In fact, it is known that the beating mass, by reciprocating motion inside the sliding cylinder behaves as a volumetric pump, causing alternating depressure inside the bottom chamber of the device, with the volume of said chamber constituting by the surface-area of the cross-section of the beating mass multiplied by its stroke. Such depressures cause intake of the dusts of material generated by the work of the tool, and of dust existing in the surrounding environment owing to any causes, which dusts, often strongly abrasive, enter the tool guide bushing, causing a reduction in its useful life, and finally, by entering the bottom chamber, cause the abrasion of the beating mass too, which is rapidly worn.

Such a drawback may often additionally cause, in said hydraulic-driven percussion devices, a pollution of the hydraulic fluid, with negative consequences to the detriment of the whole hydraulic system, with burdensome and frequent servicing operations being rendered necessary.

In order to obviate these drawbacks, for example a counter-pressure is generated by feeding compressed air or gases into the air gap between the tool guide bushing and the tool, or into the space between the beating mass and the tool, which involves, as evident, the need for having available the necessary equipment for compressing and delivering the compressed gases, with the relevant problems arising of overall dimensions and costs.

Therefore, the purpose of the present invention is to provide a hammer actuated by means of a hydraulic system, which can be used in dusty and corrosive environments without undergoing the phenomena of abrasion and/or corrosion by external agents, and which operates in a safe and reliable way even in such environments, with a minimum of servicing operations. Another purpose of the present invention is to provide a hammer actuated by means of a hydraulic system, particularly suitable for use in dusty and corrosive environments, which is simple and cheap to manufacture, and which does not involve the adoption of additional and/or auxiliary equipment of large overall dimensions, and of high cost.

These and still other purposes and relevant advantages which will be clearer from the following disclosure, are achieved by a hammer actuated by means of a hydraulic system, particularly suitable for use in dusty and/or corrosive environments, which hammer, according to the present invention, comprises a device consisting of:

at least one intake port or intake duct suitable for conveying air intaken from the external environment during the stroke of "sinking" of the beating mass of said hammer and owing to the effect of the same downwards movement of said beating mass, into the "top chamber", constituted by the rear face of said beating mass, by the inner surface of the cylinder inside which said beating mass slides, and by the bottom of said cylinder, wherein on said intake duct there are installed at least one filter, suitable for stopping the abrasive agents possibly contained in the intaken air, and at least one one-way valve suitable for enabling the filtered air to enter said top chamber and not leave it;

at least one connection duct suitable for conveying, during the "rising" stroke of the beating mass of said hammer and owing to the effect of the same upwards movement of said beating mass, the filtered air contained inside said "top" chamber into the "bottom" chamber, constituted by the front face of said beating mass, by the cylinder inside which said beating mass slides, and by the rear face of the tool of said hammer, wherein on said connection duct there is installed at least one one-way valve suitable for enabling the filtered air to flow from said top chamber into said "bottom" chamber, and not vice-versa;

said device being therefore suitable for generating inside said bottom chamber an overpressure both during said rising stroke and said sinking stroke, such as to permanently cause a filtered air stream to flow from said bottom chamber to the external environment through the clearance existing between the tool and the guide bushing for said tool.

The present invention is disclosed in greater detail according to a preferred, non-exclusive form of practical embodiment thereof, made by referring to the hereto attached drawings, supplied for the purpose of merely illustrating the invention without limiting it, in which.

In the figures the hydraulic system inside which the hydraulic fluid flows-however known from the prior art-is not shown.

Figure 1:
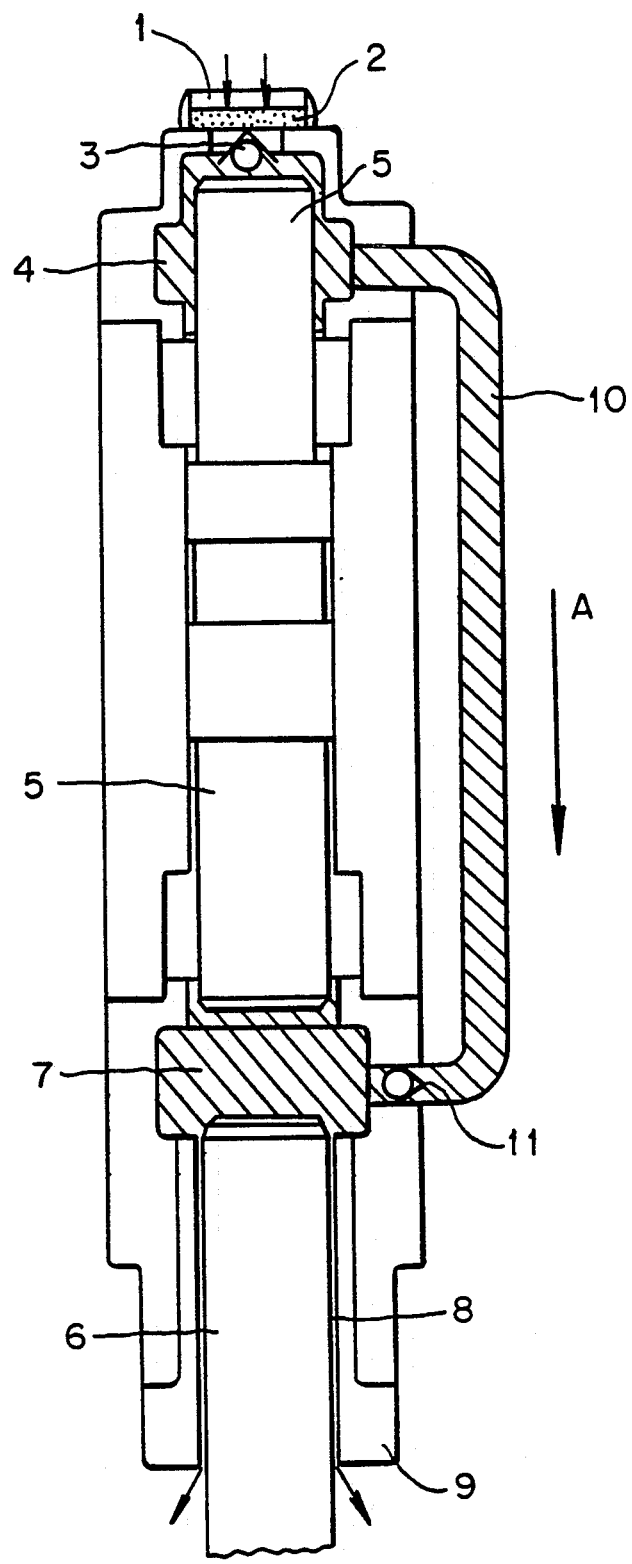
FIG. 1 is a schematic longitudinal cross sectional view of a hydraulic hammer according to the present invention in its working step during which the beating mass is in its high position, and is beginning its downwards movement towards the tool.

Referring to such figures, during the sinking stroke of FIG. 1, during which the beating mass 5 moves downwards towards the tool 6, i.e., in the step during which said beating mass travels in the direction as shown by the arrow "A", and owing to the effect of its own movement, air is intaken from the external atmosphere through the intake duct 1 and, by flowing through the filter 2 and the one-way valve 3, fills the top chamber 4. During the sinking stroke, the valve 3 remains open and allows external, previously filtered, air to fill the top chamber 4, while the one-way valve 11 remains closed.

Figure 2:
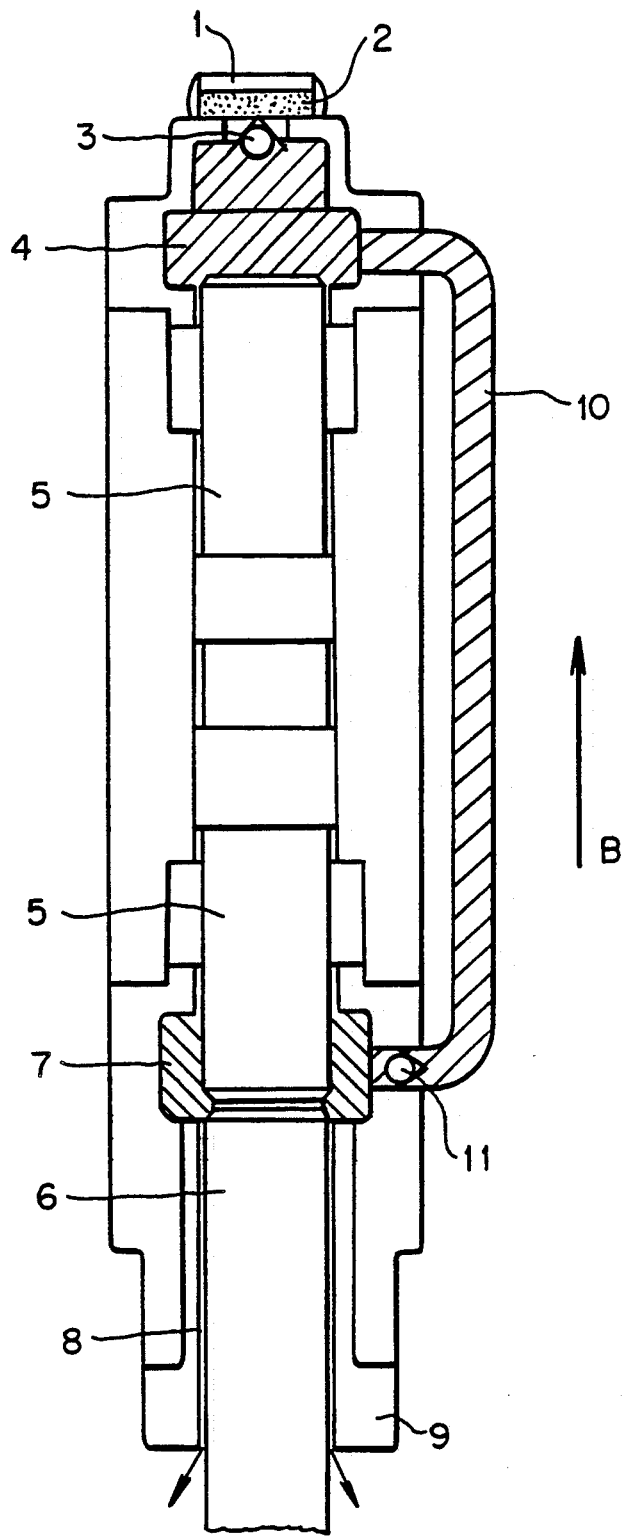
FIG. 2 is a schematic longitudinal cross sectional view similar to FIG. 1 showing the working step of the hydraulic hammer in which the beating mass is in its low position and, after ending its sinking movement, and discharging its kinetic force onto the tool, is beginning its rising movement.

During the rising stroke, during which said beating mass 5 moves upwards (FIG. 2), i.e., in the step during which said beating mass moves in the direction as shown by the arrow "B", the valve 3 closes, the valve 11 opens, and the beating mass 5 compresses the filtered and clean air collected inside the top chamber 4 forcing it to flow, through the duct 10, into the bottom chamber 7, which, consequently, remains constantly under pressure.

During the sinking stroke during which the beating mass moves downwards (according to the arrow "A"), the bottom chamber 7 is already filled with clean air which is compressed by the same sinking beating mass, and is forced to flow to the outside through the clearance 8 existing between the tool 6 and the bushing 9. Thus, the discharge of air towards the external atmosphere takes place through the clearance existing between the tool and the bushing, with said coupling being hence kept always clean.

Thus, any air amounts from the surrounding atmosphere are prevented from entering through the air gap 8 during both the rising stroke and the sinking stroke of the beating mass, with the entering being consequently prevented of abrasive dusts and/or of corrosive fumes, which would rapidly deteriorate the parts under mutual movement conditions, in particular the parts constituted by the bushing, the beating mass and/or the container cylinder.

In particular, the present Applicant was able to see how the hydraulic hammer according to the present invention can be advantageously used as a crust-breaker in the electrolysis pots for the production of aluminum metal, which, as well-known, are required to operate inside such environments, as the pot rooms, in which serious problems exist, which are caused by the presence of abrasive dusts (alumina, and the like), and by the corrosion by the fluorinated gases and fumes.

I claim:

1. A hydraulic hammer for use in dusty and/or corrosive environments having a hydraulically actuated beating mass reciprocally movable in a cylinder to strike against a tool, comprising:
    said cylinder having a longitudinal axis, along which said beating mass is reciprocally movable;
    an intake duct for conveying air from the external environment into a top chamber defined by the rear face of said beating mass, the inner surface of the cylinder and the upper base of said cylinder, during the sinking stroke of said beating mass as a result of the downwards movement thereof;
    said top chamber being located along said longitudinal axis;
    a filter arranged in said intake duct for removing abrasive agents contained in the intake air;
    a one-way valve arranged in said intake duct for permitting the filtered air to enter said top chamber;
    a connection duct for conveying the filtered air contained in said top chamber into a bottom chamber defined by the front face of said beating mass, the inner surface of the cylinder and the rear face of the tool, during the rising stroke of said beating mass as a result of the upwards movement thereof;
    said connection duct being parallel to said longitudinal axis;
    said bottom chamber being located along said longitudinal axis;
    a one-way valve in said connection duct for permitting the filtered air to flow from said top chamber into said bottom chamber;
    a guide bushing for said tool and located beneath said bottom chamber;
    and an exhaust chamber formed by the clearance between the tool and the guide bushing for said tool;
    whereby an over pressure is generated inside said bottom chamber both during said rising stroke and said sinking stroke of said beating mass, so as to permanently cause a filtered air stream to flow from said bottom chamber to the external environment through the exhaust chamber.

2. The hydraulic hammer according to claim 1, used as a crustbreaker in the electrolytic pots for the production of aluminum metal.

* * * * *